United States Patent [19]

Decker et al.

[11] 3,999,427
[45] Dec. 28, 1976

[54] HYDRAULIC-ELECTRONIC LOAD SENSING UNIT FOR LOAD INDICATING APPARATUS

[75] Inventors: Elmer L. Decker, Long Beach; James Moon, Santa Ana, both of Calif.

[73] Assignee: Decker Engineering Corporation, Long Beach, Calif.

[22] Filed: Sept. 24, 1975

[21] Appl. No.: 616,386

[52] U.S. Cl. .................................. 73/141 R; 73/143
[51] Int. Cl.[2] ............................................ G01L 1/26
[58] Field of Search ............ 73/141 R, 141 A, 143; 177/208, 151, 152, 153

[56] References Cited
UNITED STATES PATENTS

| 2,472,047 | 5/1949 | Ruge | 73/141 A |
|---|---|---|---|
| 3,060,732 | 10/1962 | Corry | 73/141 R |
| 3,120,754 | 2/1964 | Lebow | 177/211 X |
| 3,258,300 | 6/1966 | Saunders | 73/141 A X |
| 3,263,497 | 8/1966 | Leiber | 73/141 A |
| 3,472,069 | 10/1969 | Webb | 73/141 R |

Primary Examiner—Charles A. Ruehl
Attorney, Agent, or Firm—Paul A. Weilein

[57] ABSTRACT

A load sensing unit for load indicating apparatus, the sensing unit comprising a hydraulic load cell and an electronic load cell connected in stacked relation between opposed members of the apparatus capable of relative movements under applied load forces, and wherein means are provided to operably selectively bypass the load forces with respect to each of said load cells, in order to operatively inactivate one of the load cells, and hold it in reserve as a back-up cell which is susceptible of immediate connection for the active operative other load cell.

14 Claims, 5 Drawing Figures

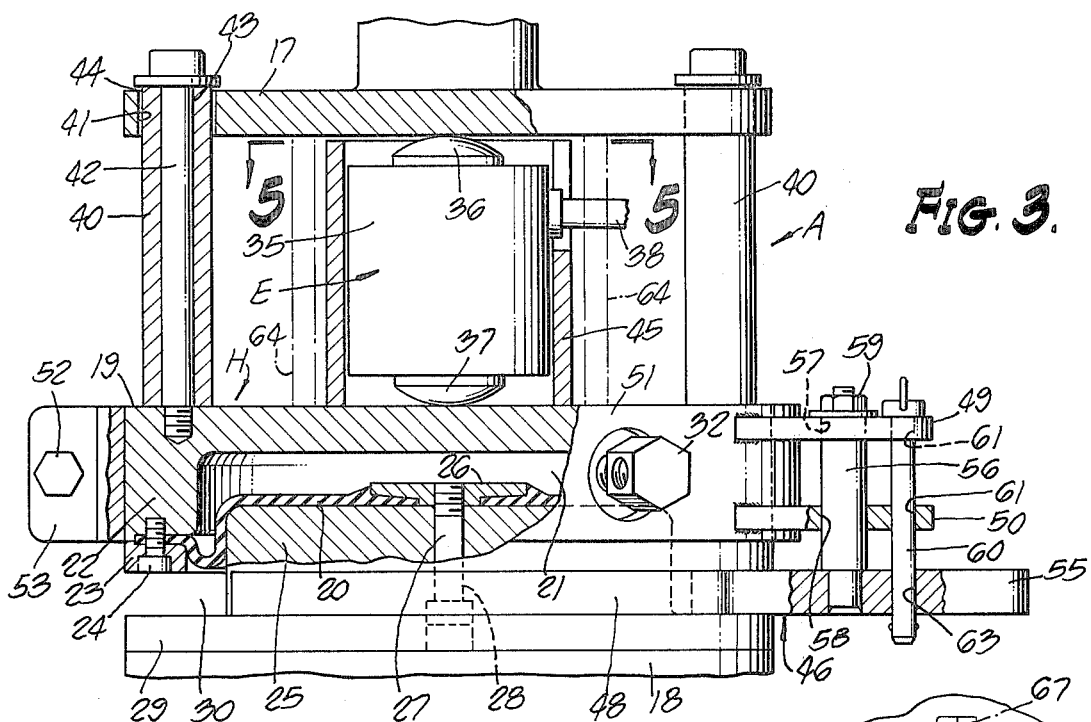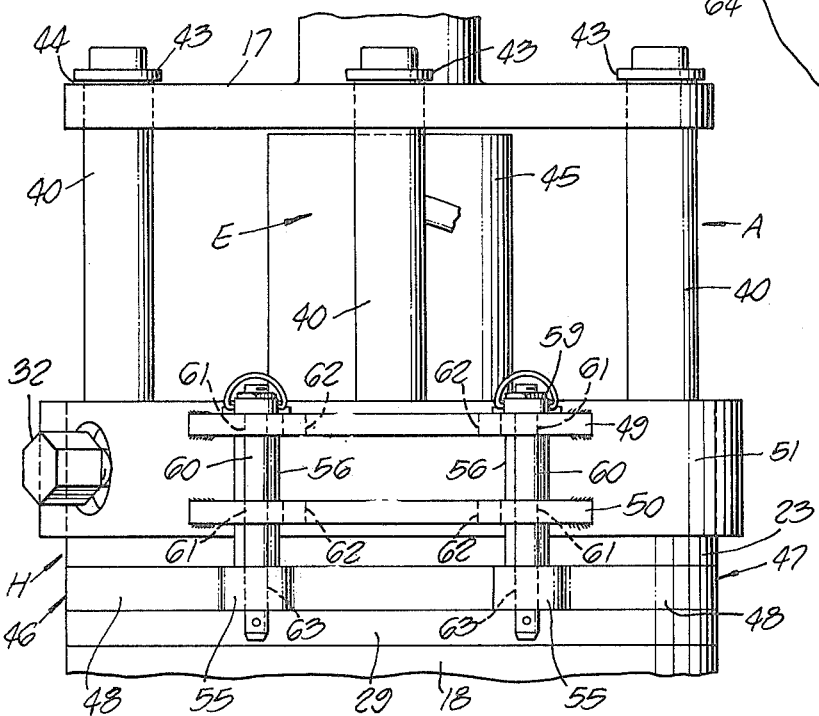

HYDRAULIC-ELECTRONIC LOAD SENSING UNIT FOR LOAD INDICATING APPARATUS

PRIOR ART

In the prior art there are numerous embodiments of load indicating apparatus in which one or more load cells are utilized for indicating the loads sustained by lines or cables and the like in various types of equipment. The closest art known to applicant are the following U.S. Pat. Nos.:

3,229,515, issued Jan. 18, 1966;
3,295,086, issued Dec. 27, 1966;
3,352,152, issued Nov. 14, 1967;
3,472,069, issued Oct. 14, 1969;
3,538,764, issued Nov. 10, 1970;
3,722,268, issued Mar. 27, 1973.

BACKGROUND OF THE INVENTION

The present invention relates generally to load cell sensing devices such as utilized in connection with apparatus for indicating the loads sustained by the lines, cable and the like in cranes, derricks, and similar equipment.

Heretofore, load cell sensing devices have in the main comprised two general types which have been commonly referred to as a hydraulic load cell and an electronic or electric load cell.

Hydraulic load cells have been used for a number of years and can briefly be described as instruments which measure force or load information by means of hydraulic pressure and are usually connected to an indicator such as a Bourdon tube for translation of hydraulic pressure into force or weight indications on an indicating or recording instrument. The hydraulic load cell is of rugged dependable construction and is susceptible of repair and overhaul in the field by the usual technician. The hydraulic load cell poses one disadvantage, however, in that the distance at which a remote indicator may be positioned is limited due to line resistance and response lag.

More recently, consideration has been given to the possibility of utilizing electronic or electric load cells which have the advantage of permitting the establishment of the indicating instrumentation at remotely distant positions which are not possible in the case of the hydraulic load cell. However, the electronic or electric load cell is rather delicate and sensitive to such an extent that these cells in certain installations are less dependable than the hydraulic load cell. Also, the electronic or electric load cell requires more specialized personnel for repair and maintenance.

While the usual load indicating apparatus has in most cases utilized one or the other of these load cells as the sensing medium, there are heretofore known arrangements in which several load sensing cells have been utilized in combination. For example, there is disclosed in U.S. Pat. No. 3,229,515, issued Jan. 18, 1966, an arrangement wherein a hydraulic load cell is utilized as the primary sensing device, and an electric load cell in the form of a transducer is utilized for converting the variations of the hydraulic fluid in the hydraulic load cell into electric signals.

In U.S. Pat. No. 3,295,086, issued Dec. 27, 1966, a plurality of load cells of the electronic or electric type with different load ranges are mechanically connected in series to provide a multi-range load sensing cell assembly.

Also, from U.S. Pat. No. 3,472,069, issued Oct. 14, 1969, it has been known to provide a load cell protecting device in which a by-pass mechanism is utilized to temporarily remove the load forces from the load cell between successive applications.

The present invention seeks to provide a load sensing arrangement which combines an electronic or electric type load cell and hydraulic load cell in such a manner that they may be operated selectively to sense the load, and wherein the load cells mutually provide a back-up for each other.

During the early stages of development of the general concept of the present invention, it was thought that the hydraulic load cell and the electronic or electric load cell could be combined and utilized respectively for load sensing, simply by mounting them mechanically in stacked relation, each of the load cells being individually connected to its particular indicator. It soon became apparent, however, that the desired results could not be obtained in this manner because of the different response characteristics of the two types of load cells. The electronic or electric load cell, by virtue of its being very sensitive and operable upon relatively small load displacements of the order of ten-thousandths of an inch in a load range of, e.g., 0–40,000 pounds, is incompatible with the larger load displacement movements in the hydraulic cell wherein the movements are in fractions of an inch. It thus became evident that with the two cells in stacked relation, the desired results would not be obtained, since the sensitive electronic cell would operate only to indicate the sensitive pulsations and fluctuations in the hydraulic cell, and would not therefore provide a true load indication.

The foregoing problem has been solved in the present invention by providing unique means for selectively by-passing the load with respect to each cell. This unique concept thus makes it possible to combine the more sensitive electronic cell with the more rugged hydraulic cell in a manner such that the advantageous features of both cells may be utilized. With such an arrangement, the electronic load cell would be normally utilized to indicate the load forces, while the dependable and rugged hydraulic cell would be maintained in an inactive condition by by-passing the load forces around it, and so as to serve as a readily available back-up which could be put into active service in place of the electronic cell, at any time at a minimum cost.

SUMMARY OF THE INVENTION

The present invention is more specifically concerned with the provision of a unique load sensing unit which utilizes both an electronic load sensing cell and a hydraulic load sensing cell which are mechanically connected in series and which can be selectively utilized as the load sensing medium, while retaining the non-selected cell as a back-up cell.

It is one object of the present invention to provide an improved load sensing unit in which a plurality of load sensing cells are mechanically connected in stacked relation in series with the load, and in which either of the load sensing cells may be utilized as the active load sensing medium, while the other cell serves as a readily available back-up cell for the cell which is being actively utilized.

A further object is to provide a combination load sensing unit according to the foregoing object, in which one of the load sensing cells is of the hydraulic type, and the other is of the electronic or electric type.

A still further object is to provide a unique load sensing unit containing both hydraulic and electronic load sensing cells, which can be economically produced and of a size which can be employed in connection with various types of force or load measuring and indicating apparatus, such as cable anchors for oil well drilling apparatus, and similar equipment.

Another object is to provide a load sensing unit according to the preceding object, which includes unique load by-passing means for each of the load sensing cells, and which permits each cell to be selectively inactivated and held in reserve as a readily available back-up cell, while utilizing the other cell as an active load sensing medium.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 3 is a fragmentary vertical sectional view taken substantially on line 3—3 of FIG. 2, and showing mounting details for the hydraulic and electronic load cells;

FIG. 4 is a side elevational view as seen from the right side of the device in FIG. 3; and FIG. 5 is a fragmentary transverse sectional view, taken substantially on line 5—5 of FIG. 3.

Description of a Preferred Embodiment

Figure 1:
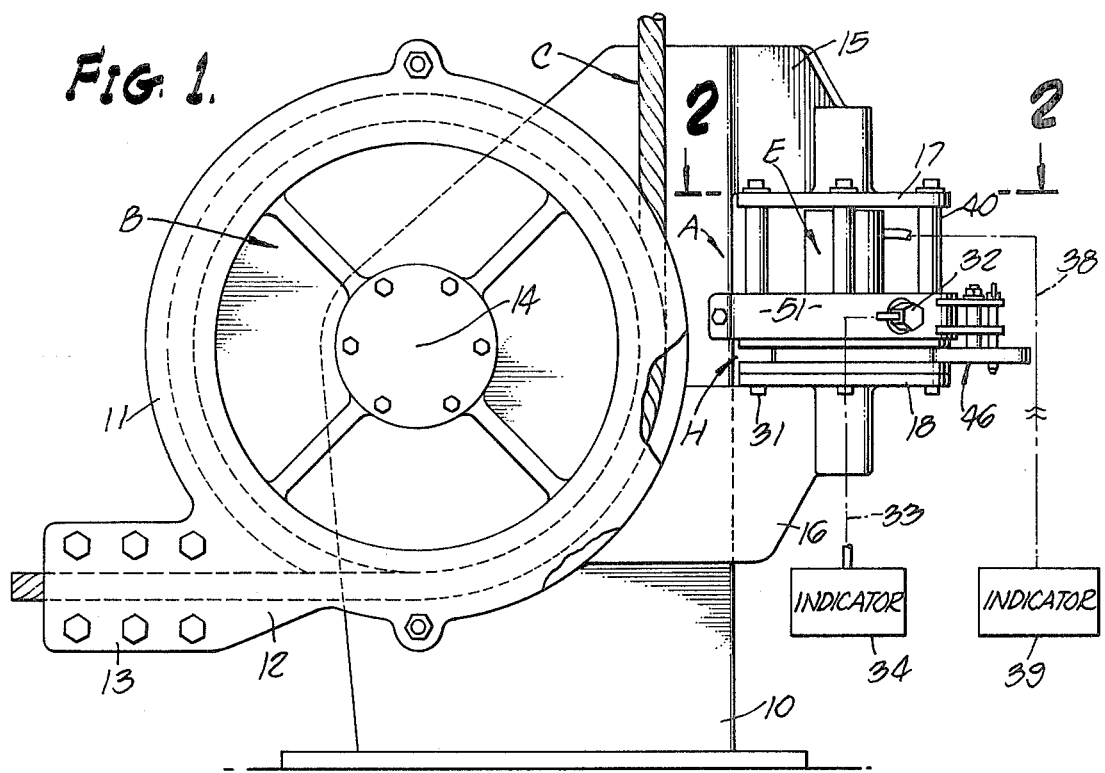
FIG. 1 is a side elevational view of a combined cable anchor and weight indicating apparatus which includes a load sensing unit according to the present invention.
Figure 2:
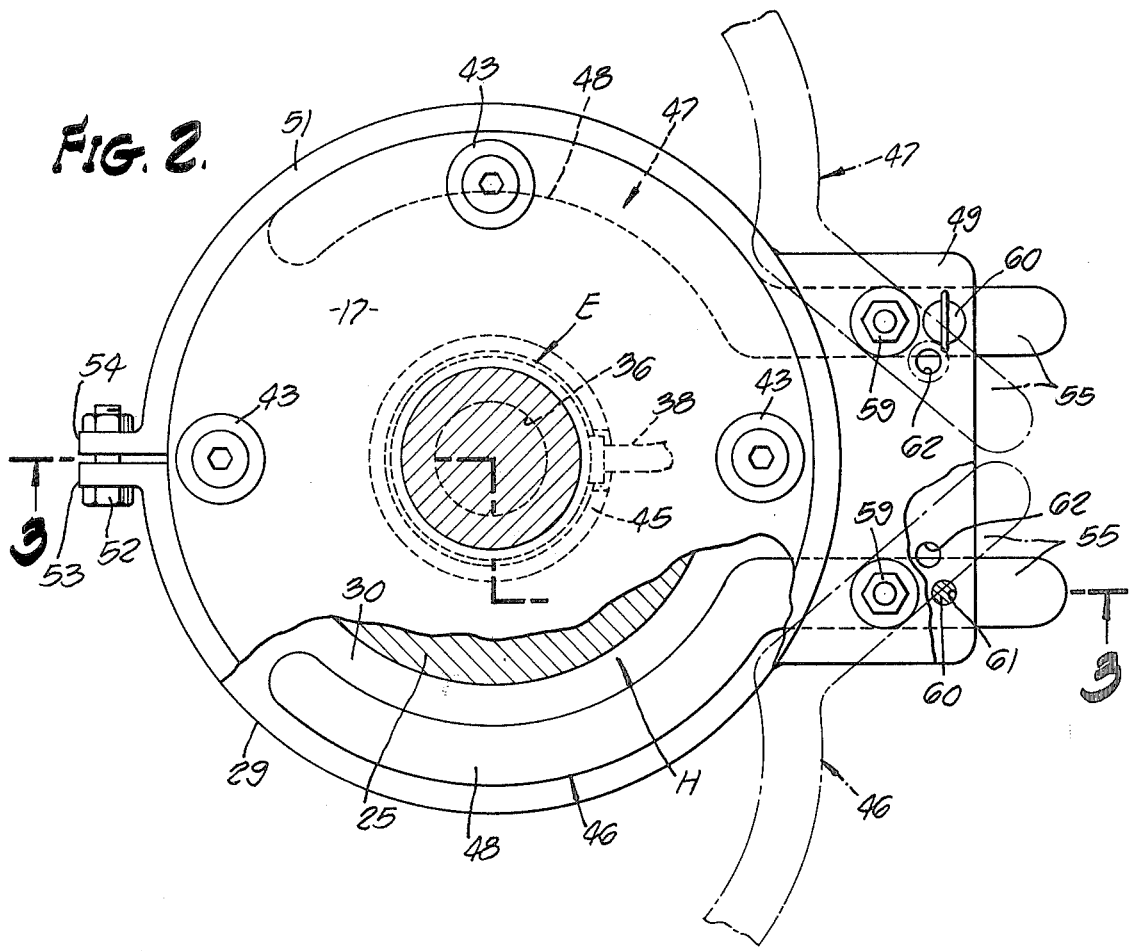
FIG. 2 is an enlarged fragmentary sectional view taken substantially on line 2—2 of FIG. 1, and showing the load sensing unit in top plan view together with details of the load by-passing means for the hydraulic load cell.

Referring more specifically to the drawings, a load sensing unit A embodying the present invention is shown in FIG. 1 as forming a part of a combined cable anchor and weight indicating apparatus B, such as employed in connection with well drilling apparatus. This combined cable anchor and weight indicating apparatus B includes a base 10 on which is mounted a rotary snubbing drum 11 around which is wound a number of turns of the cable C which may be the deadline of a hoist system for a rotary well drilling rig. A rigid arm 12 carried by the drum supports a releasable cable clamp 13 for dead-ending the cable. The base 10 is extended upwardly to a point above an axis of rotation 14 of the drum 11, where it is provided with a fixed arm extension 15. The drum 11 is constructed to provide an arm extension 16 which is movable with the drum 11 in response to the application of load forces on the cable C. The arms 15 and 16 are in spaced apart substantially parallel relation, and in the arrangement shown in FIG. 1 are relatively movable in a direction towards each other under the applied load forces on the cable C. The arms are respectively provided with opposed plate members 17 and 18 which are fixed to their associated arms and between which the load sensing unit A is operatively supported.

In accordance with the present invention, the load sensing unit A includes a combined electronic or electric load cell E and a hydraulic load cell H which are mounted in axially aligned stacked relationship for series reaction to compressive load forces resulting from the relative movement of the arms 15 and 16 in a direction towards each other.

As best shown in FIGS. 1 and 3, the hydraulic load cell H is mounted on the opposed plate member 18 and comprises an upper casing 19 having a cavity which coacts with a flexible diaphragm 20 to form an expansible chamber 21 for containing a hydraulic fluid. The diaphragm is clampingly secured at its periphery to a surrounding wall 22 of the upper casing by a clamping ring 23, this ring being secured by retaining screws 24. The inner area of the diaphragm extends over the uppermost end of a load pad 25 and is shown as being centrally secured by means of a flanged nut 26 having threaded engagement with the threaded end of a central retaining bolt 27 mounted in an axial bore or passage 28 formed in the load pad. The load pad has a radially projecting base flange 29 which extends circumferentially below the clamping ring 23 in spaced relation so as to form therewith an outwardly opening surrounding space or groove 30. The load pad is secured to the opposed plate member 18 by means of a plurality of circumferentially spaced retaining bolts 31 (FIG. 1). The chamber 21 is connected by a fitting 32 with a fluid line 33 which is in communication with a suitable indicator 34 such as an appropriate gauge which may be located at a remote location. Thus, changes of hydraulic fluid pressure in the chamber 21 in response to relative movements between the upper casing 19 and the load pad 25 in response to load variations may be suitably indicated.

The electronic or electric load cell E, as illustrated herein, is of a commercially available type in which the components are contained within a suitable housing 35 and are mechanically interconnected with load force applying members 36 and 37 at opposite ends of the housing, and electrically connected with an appropriate electric output signal circuit 38 for transmitting the output signals of the load cell to an appropriate indicator 39 which may be located at a remote readout point.

In the present invention, the electronic load cell E is illustrated as being of the compression type, and this cell is mounted in stacked relation with respect to the hydraulic load cell and has its force applying members 36 and 37 respectively connected in engagement with the plate member 17 and the upper casing 19 which are connected for relative axial movements.

The plate member 17 is supported for axial sliding movements on a plurality of upstanding guide sleeves 40 which slidably extend through appropriate peripheral openings 41 in the plate member 17, these sleeves being respectively secured to the upper casing 19 by means of cap bolts 42. The cap bolts have threaded ends for threaded engagement with the upper casing, and the head ends of these bolts have an annular projecting abutment flange 43 for engagement with the adjacent end edge of the associated sleeve. It should be noted that the length of the guide sleeves is such that a slight clearance, as indicated at 44, will exist between the flange 43 and the upper surface of the member 17, when the member 17 and upper casing 19 are respectively engaged with the force applying members 36 and 37. This clearance serves to enable slight relative movements of the plate member 17 in a direction towards and away from the upper casing 19. A sleeve member 45 is disclosed as being in surrounding relationship to the housing 35 of the electronic load cell. This sleeve has a length slightly less than the total distance between the outermost points of the force applying elements 36 and 37, and serves as a protective measure to limit the extent of force responsive movements which may be applied by the load forces against the members 36 and 37. Otherwise, the forces might, under certain conditions, be so extreme as to damage the load cell.

An important feature of the present invention is the provision of means which permits the hydraulic load cell H and the electronic load cell E to be selectively by-passed with respect to the applied load forces in order to permit the selected load cell to be used as the normal load sensing indicator, while retaining the non-elected load cell as a back-up unit, when required.

The lockout or load by-passing means for the hydraulic load cell H comprises a pair of elongated arms 46 and 47 which are positioned on opposite sides of the hydraulic cell and supported for movement of arcuate portions 48 thereof into arcuate portions of the groove 30, the arcuate portions of the arms being of such thickness as to engage the adjacent surfaces of the clamping ring 23 and the base flange 29, and thus serve to prevent or block movement of the upper casing 19 and load pad 25 in a direction towards each other. In this manner, the hydraulic load cell will be inactivated and the load force will be by-passed directly between the load pad 25 and the upper casing 19, and applied directly to the electronic load cell E. The load cell E, under these conditions, becomes the main sensing element, while the hydraulic load cell H, in its inactive condition will constitute a back-up or stand-by, until needed.

In the disclosed arrangement, the arms 46 and 47 are operatively supported from a bracket which includes a pair of spaced apart plate members 49 and 50 which are welded or otherwise secured to a split clamping ring 51 secured in clamped engagement around the wall 22 of the upper casing 19, the clamping ring being retained in clamped position by means of a securing lug bolt 52 engaged with end lugs 53 and 54 of the clamping ring.

Each of the arms 46 and 47 is formed with a straight end portion 55 which extends from its arcuate portion 48 and carries a supporting hinge pin 56 that swingably supports the arm below the bracket support in a position where it may be moved into and out of the groove 30. The hinge pin 56 is secured at its lowermost end to the arm intermediate the ends of the straight end portion 55, and is rotatably supported for rotational movement in aligned openings 57 and 58 of the plates 49 and 50 by means of a flanged nut 59 in threaded engagement with a threaded upper projecting end of the hinge pin, this nut bearing against the upper surface of the plate member 49.

The arms 46 and 47 are arranged to be respectively latched in an active position within the groove 30 or a non-active position removed from the groove 30 by means of a latching pin 60 which may be positioned selectively to extend through aligned pairs of openings 61 and 62 in the plate members 49 and 50, and an opening 63 in the straight end portion 55 of each arm.

The lockout or load by-passing means for the electronic load cell E is shown in FIG. 5 as comprising a split sleeve 64 having a pair of arcuate sections which may be positioned around the sleeve member 45 of the electronic load cell E and secured in assembled relation by means of lug bolts 65 for respectively engaging a pair of abutting end lugs 66 and 67 in each case. This sleeve is of greater length than the sleeve 45 and is of a length which will block or restrain relative movement towards each other of the plate member 17 and upper casing 19. In its lockout position, the sleeve 64 rigidly by-passes the load forces between the plate member 17 and the upper casing 19 in a manner to inactivate the electronic load cell E. With the sleeve 64 in the position shown in dotted lines in FIG. 3, the arms 46 and 47 may be removed from the groove 30 so as to activate the hydraulic load cell as the sensing unit.

From the foregoing description and drawings, it will be clearly evident that the delineated objects and features of the invention will be accomplished.

Various modifications may suggest themselves to those skilled in the art without departing from the spirit of our invention, and hence, we do not wish to be restricted to the specific forms shown or uses mentioned except to the extent indicated in the appended claims.

We claim:

1. A load sensing unit for load indicating apparatus having a pair of spaced apart opposed members supported for relative movements under applied load forces, comprising:
   a. a pair of load cells, one of the hydraulic type and one of the electronic type, mechanically interconnected in series operative relationship between said opposed members and operatively responsive to compression load forces; and
   b. means operable to selectively by-pass the applied load forces with respect to each of said load cells, whereby a load by-passed load cell is operatively inactivated and provides an immediately connectable back-up for the active non-by-passed other load cell, said hydraulic load cell including an upper casing and means including a load pad connectable with one of said opposed members, said upper casing and said means being interconnected for relative movement and coacting to form a variable hydraulic pressure chamber adapted to contain a liquid; and in which said electronic load cell is positioned with one end connected with said upper casing and its opposite end connected with the other of said opposed members.

2. A load sensing unit according to claim 1, wherein said load by-pass means includes means for selectively opposing relative movement between said other of said opposed members and said upper casing in a direction towards each other.

3. A load sensing unit according to claim 2, in which the means for opposing said relative movement comprises rigid means for interconnecting said other of said opposed members and said upper casing.

4. A load sensing unit according to claim 2, in which the means for opposing said relative movement comprises a cylindrical structure surrounding said electronic load cell, and having its opposite ends respectively engaged with said other of said opposed members and said upper casing.

5. A load sensing unit according to claim 4, in which said cylindrical structure comprises a split sleeve in which a pair of sleeve sections are releasably interconnected at their adjacently joined ends.

6. A load sensing unit according to claim 1, which includes means for movably connecting said other of said opposed members and said upper casing.

7. A load sensing unit according to claim 6, wherein said means for movably connecting said other of said opposed members includes a plurality of peripheral upstanding sleeve members respectively guidingly extending through peripheral openings in said other of said opposed members, and sleeve securing cap bolts respectively extending through said sleeves, said bolts having inner ends in threaded engagement with the upper casing, and outer ends radially projecting beyond the outer periphery of the adjacent sleeve end to prevent removal of said other of said opposed members.

8. A load sensing unit according to claim 1, wherein said load by-pass means includes means for selectively opposing relative movement between said upper casing and said load pad in a direction towards each other.

9. A load sensing unit according to claim 8, in which said means for opposing said relative movement comprises means for rigidly interconnecting said upper casing and said load pad.

10. A load sensing unit according to claim 8, in which said upper casing and said load pad have confronting surfaces which are normally separated by a space; and said means for opposing said relative movement comprises an insert removably positioned to bridge said space, and being engaged respectively with said confronting surfaces.

11. A load sensing unit according to claim 1, in which said upper casing and said load pad are formed to provide normally spaced apart circumferentially extending confronting surfaces; and wherein said load by-pass means includes: bracket means carried by said upper casing, a pair of elongate arm members pivotally supported on said bracket means for swinging movements, said arms having arcuate portions extending generally on opposite sides of said space and being selectively swingably movable between positions removed from said space and positions within portions of said space in bridging relation to said confronting surfaces.

12. A load sensing unit according to claim 11, in which said bracket means are attached to said upper casing by a clamping ring.

13. A load sensing unit according to claim 11, including means for releasably securing said arms in their positions with the said space.

14. A load sensing unit according to claim 11, including means for releasably securing said arms in their positions removed from said space.

* * * * *